(12) United States Patent
Horie et al.

(10) Patent No.: US 10,929,054 B2
(45) Date of Patent: Feb. 23, 2021

(54) SCALABLE GARBAGE COLLECTION

(71) Applicant: INTERNATIONAL BUSINESS MACHINES CORPORATION, Armonk, NY (US)

(72) Inventors: Michihiro Horie, Saitama (JP); Kazunori Ogata, Saitama (JP); Hiroshi Horii, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/433,531

(22) Filed: Jun. 6, 2019

(65) Prior Publication Data

US 2020/0387322 A1 Dec. 10, 2020

(51) Int. Cl.
*G06F 12/00* (2006.01)
*G06F 3/06* (2006.01)
*G06F 9/48* (2006.01)

(52) U.S. Cl.
CPC .......... *G06F 3/0652* (2013.01); *G06F 3/0608* (2013.01); *G06F 3/0659* (2013.01); *G06F 3/0673* (2013.01); *G06F 9/4881* (2013.01)

(58) Field of Classification Search
CPC .... G06F 3/0652; G06F 3/0608; G06F 3/0659; G06F 3/0673; G06F 9/4881
See application file for complete search history.

(56) References Cited

U.S. PATENT DOCUMENTS

| | | | |
|---|---|---|---|
| 10,186,007 B2 | 1/2019 | Barik et al. | |
| 10,261,898 B1* | 4/2019 | Payer | G06F 12/0253 |
| 2001/0056420 A1* | 12/2001 | Steele, Jr. | G06F 9/52 |
| 2003/0005025 A1* | 1/2003 | Shavit | G06F 9/4843 718/102 |
| 2005/0216533 A1* | 9/2005 | Berkhin | G06F 16/951 |
| 2011/0246543 A1* | 10/2011 | Gracie | G06F 12/0269 707/816 |
| 2012/0166644 A1* | 6/2012 | Liu | G06F 9/5094 709/226 |
| 2012/0191947 A1* | 7/2012 | Horii | G06F 9/52 712/205 |
| 2012/0254267 A1* | 10/2012 | Printezis | G06F 12/0269 707/818 |
| 2014/0149715 A1* | 5/2014 | Inman | G06F 15/17393 712/29 |
| 2016/0026392 A1 | 1/2016 | Harris et al. | |
| 2016/0232035 A1 | 8/2016 | Lev et al. | |
| 2017/0083365 A1 | 3/2017 | Zhao et al. | |
| 2018/0314633 A1* | 11/2018 | Horie | G06F 9/4843 |
| 2018/0357291 A1* | 12/2018 | Choi | G06F 16/2379 |

(Continued)

OTHER PUBLICATIONS

Nimar S. Arora et al., "Thread Scheduling for Multiprogrammed Multiprocessors", Proceedings of the Tenth Annual ACM Symposium on Parallel Algorithms and Architectures (SPAA), Puerto Vallarta, Mexico, Jun. 1998.

*Primary Examiner* — Prasith Thammavong

(74) *Attorney, Agent, or Firm* — Tutunjian & Bitetto, P.C.; Randall Bluestone

(57) ABSTRACT

Methods and systems for performing memory garbage collection include determining a size of N double-ended queues ("deques") associated with N respective garbage collection threads, where N is three or greater. A task is popped from a deque out of the N deques having a largest size. Garbage collection is performed on the popped task.

19 Claims, 6 Drawing Sheets

(56) References Cited

U.S. PATENT DOCUMENTS

2019/0361805 A1* 11/2019 Horie .................... G06F 9/4881
2020/0105046 A1*  4/2020 Wald .................... G06T 15/005
2020/0151003 A1*  5/2020 Horie .................. G06F 12/0253

* cited by examiner

SCALABLE GARBAGE COLLECTION

BACKGROUND

The present invention generally relates to garbage collection in computing systems and, more particularly, to evaluating multiple garbage collection queues before selecting one to take a garbage collection task from.

Garbage collection in multi-threaded systems can be performed using multiple garbage collection threads, each having a respective double-ended queue (hereinafter "deque") that stores a set of garbage collection tasks. When a garbage collection thread finishes the last task in its deque, it can seek to take tasks from other deques belonging to other garbage collection threads. This promotes load balancing and prevents idleness.

However, as the number of garbage collection threads increases, it can be difficult to determine which deque to take tasks from, as a greater number of threads may have empty deques. Furthermore, the use of memory fences incurs a high overhead in the event that an attempt to take a task from a garbage collection deque fails, for example because the deque owner has already taken the task in question.

SUMMARY

A method for performing memory garbage collection includes determining a size of N double-ended queues ("deques") associated with N respective garbage collection threads, where N is three or greater. A task is popped from a deque out of the N deques having a largest size. Garbage collection is performed on the popped task.

A memory garbage collection system includes a first garbage collection thread, executed by a processor device, that is configured to determine a size of N double-ended queues ("deques") associated with N respective additional garbage collection threads, where N is three or greater. The first garbage collection thread pops pop a task from a deque out of the N deques having a largest size and performs garbage collection on the popped task.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Embodiments of the present invention provide garbage collection methods and systems that efficiently perform load balancing by having garbage collection threads take work from deques belonging to other garbage collection threads. When a particular garbage collection thread goes to take work from another, it evaluates multiple deques (e.g., at random) to find a deque where the likelihood of successfully taking work will be the highest. As the number of garbage collection threads increases, so too does the number of deques that are considered before taking work. The small overhead needed to check the additional deques is outweighed by the avoided cost of failed work-taking operations.

The term "garbage collection" in the field of computer science refers to managing memory use by programs in an automatic fashion. A garbage collection thread is a process that identifies and deallocates memory that is no longer needed by a program. This contrasts to systems in which a programmer manually deallocates memory, which is a time-consuming and error-prone practice. However, garbage collection can be resource-intensive for the computer system. Thus, in multi-threaded systems, for example systems with multiple processors or processor cores, parallelism in garbage collection provides significant benefits.

Load balancing between garbage collection threads can be a challenge. In some circumstances, one thread will exhaust its work, while another thread may have a backlog. To address this, garbage collection threads can practice "work stealing," whereby a garbage collection thread without work can take work from another thread. The challenge then becomes selecting the most appropriate thread to take work from.

It becomes more difficult to determine which thread to take work from as the number of garbage collection threads increases. Because there is no a priori knowledge of which threads have many tasks, the thread or threads to be considered are generally selected randomly. Random selection is less likely to identify garbage collection threads with many tasks as the number of threads increases, as many threads may have few tasks due to load balancing. A relatively small number of threads may have a backup in work, and these threads become more difficult to find among the many garbage collection threads.

Figure 1:
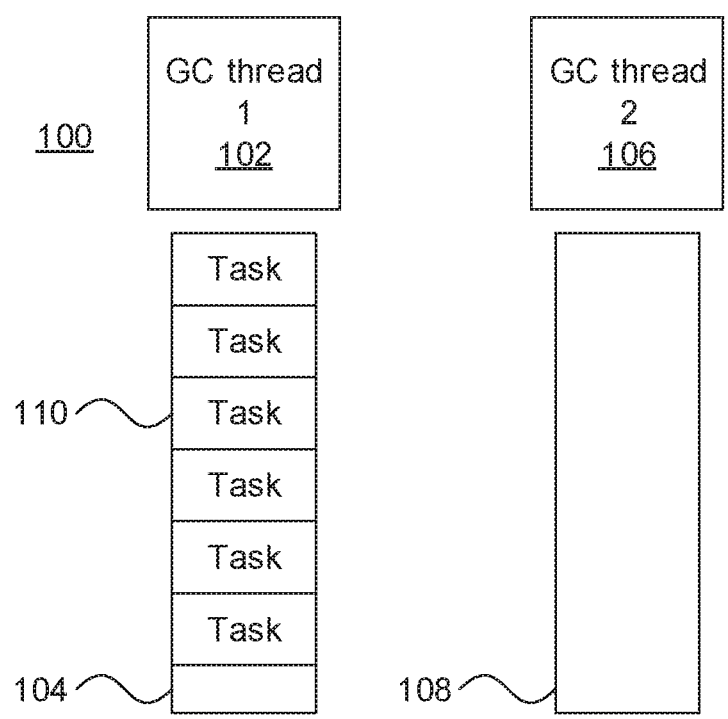
FIG. 1 is a diagram of work-stealing memory garbage collection threads where an owner thread can pop multiple tasks at a time without conflicting with other garbage collection threads in accordance with an embodiment of the present invention.

Referring now to FIG. 1, a diagram of an exemplary garbage collection system 100 is shown. A first garbage collection 102 is shown with its double-ended queue (hereinafter "deque") 104, from which tasks 110 can be popped from either the top or the bottom. Each first garbage collection thread pops one or more tasks 110 from the top of its deque for processing. Additional garbage collection tasks 110 can be added to the deque as an application performs its functions. The first garbage collection thread 102 continues to operate in this fashion until its deque 104 is empty.

A second garbage collection thread 106 is also shown and has a corresponding deque 108. The second deque 108, however, is empty. In this case, the second garbage collection thread 106 will attempt to take work from another deque (e.g., the deque 104 of the first garbage collection thread 102). When a garbage collection thread takes work from the deque of another thread, it pops a single task from the bottom of that deque.

In general, when a garbage collection thread 102 pops one or more tasks 110 from its own deque 104, it issues a memory fence. Similarly, when a second garbage collection thread 106 attempts to take work from another thread's deque 104, the second garbage collection thread 106 issues a memory fence. A memory fence is an instruction that enforces an ordering constraint, where operations that were issued before the memory fence are completed before operations that are issued after the memory fence. Using memory fences is important for maintaining consistency, particularly in multi-threaded environments. However, memory fences also impose a performance penalty, as they diminish the system's ability to optimize operations.

To decrease the number of memory fences that are issued by a garbage collection thread 102, the garbage collection thread 102 can pop multiple tasks 110 from its deque 104 at a time. Thus the garbage collection thread 102 will work for a longer period of time before it completes it needs to pop more tasks 110 and issue another memory fence. A consequence of this, however, is that a second garbage collection thread 106 that attempts to take a task 110 from the first garbage collection thread 102 can be deprived of work, reducing the efficiency of the system.

The present embodiments therefore give priority to the second garbage collection thread 106. If the first garbage collection thread 102 reserves a set of N tasks 110, and the second garbage collection thread 106 attempts to take one of those tasks 110, the first garbage collection thread 102 releases its reservation so that the second garbage collection thread 106 can take the task. The number of tasks which the first garbage collection thread 102 takes at a time depends on the number of tasks 110 in the respective deque 104.

There can be any number of garbage collection threads, including any number of threads 102 that have deques 104 with work to spare and any number of threads 106 that have deques 108 that are empty. When the number of garbage collection threads is small (e.g., three), it is a simply matter for a garbage collection thread 106 to compare the deques of the two other threads to determine which of the deques would be better to take work from. As the number of threads increases, and so as the number of potentially empty deques 108 increases, so too does the likelihood that any two randomly selected deques will be empty and will not have any work to spare. In this case, the thread 106 that is attempting to take work can waste time and resources with a memory fence that fails to result in work being taken.

To address this problem, the present embodiments compare the deques of multiple garbage collection threads, with the number of threads being considered depending on the number of garbage collection threads at work in the system. Comparing the size of deques incurs a relatively low overhead as compared to trying—and failing—to take work from a deque with too few tasks in it. As such, the present embodiments increase the number of threads being compared as the number of garbage collection threads increases.

Figure 2:
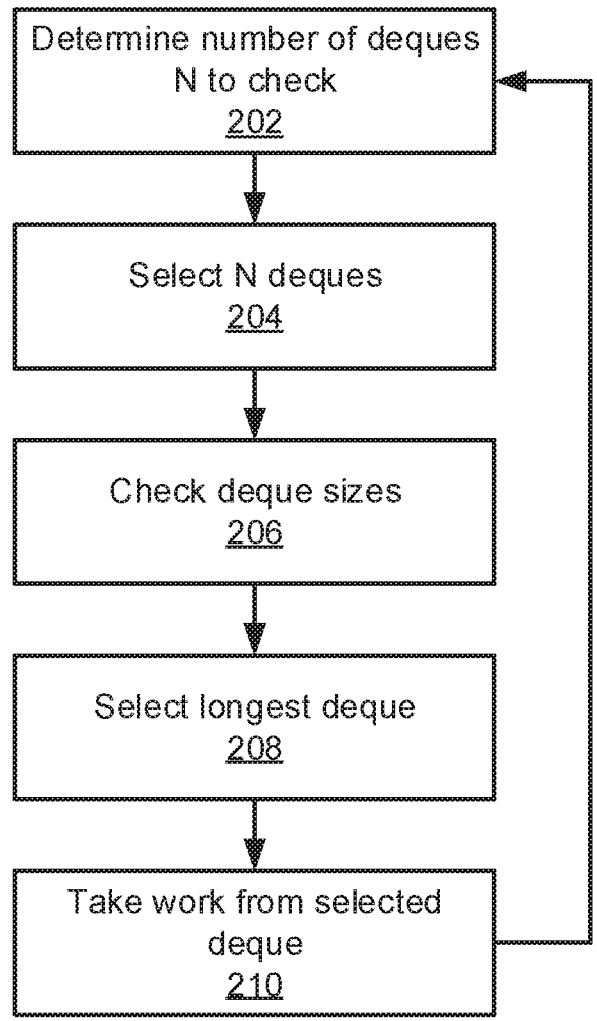
FIG. 2 is a block/flow diagram of a method for performing garbage collection in a system that has many garbage collection threads in accordance with an embodiment of the present invention.

Referring now to FIG. 2, a method of load balancing with multiple garbage collection threads is shown. This method is performed by a garbage collection thread 106 that has exhausted its own deque 108 and seeks to take work from a deque 104 that still has tasks 110 in it. Block 202 determines a number N of deques to test. As will be described in greater detail below, this number can be initially set based on the number of garbage collection threads and can then be dynamically adjusted based on the wait times of the garbage collection threads. It is specifically contemplated that the number N will be three or greater to improve performance in systems with many garbage collection threads.

Block 204 then selects N deques from other garbage collection threads. The deques can be selected randomly or by any other appropriate process. Block 206 determines the sizes of the selected deques. Size estimation is a non-atomic process, making it inexpensive to perform relative to operations that include memory fences. Size estimation can be a simple measure of the number of tasks 110 in a deque 104 or can include any other appropriate metric.

Block 208 compares the deque sizes and selects the largest deque (e.g., the one with the greatest number of tasks or, in the case of a tie, any one of the tied deques). Block 210 then attempts to take work from the selected deque. Taking work from the selected deque can include, for example, popping a single task from the bottom of the deque using, for example, a compare-and-swap process that issues a memory fence.

In some cases, block 210 can fail to take work from the selected deque. This can happen if, for example, the owner thread for the selected deque pops the last task 110 in the deque before block 210 can take that task. In such an event, processing returns to block 202 and another set of N deques is evaluated. This process can repeat for a predetermined number of times, until a maximum number of trials has been reached. This maximum number can be determined by any appropriate method, for example using a heuristic such as doubling the number of garbage collection threads. When a thread reaches the maximum number of attempts, it stops taking work and goes into a termination phase. When all the garbage collection go into the termination phase, garbage collection ends. During the termination phase (i.e., while other threads are still working), a thread that receives new work goes back into garbage collection and will attempt to take work from other threads until it reaches the maximum number of attempts and returns to the termination phase.

Figure 3:
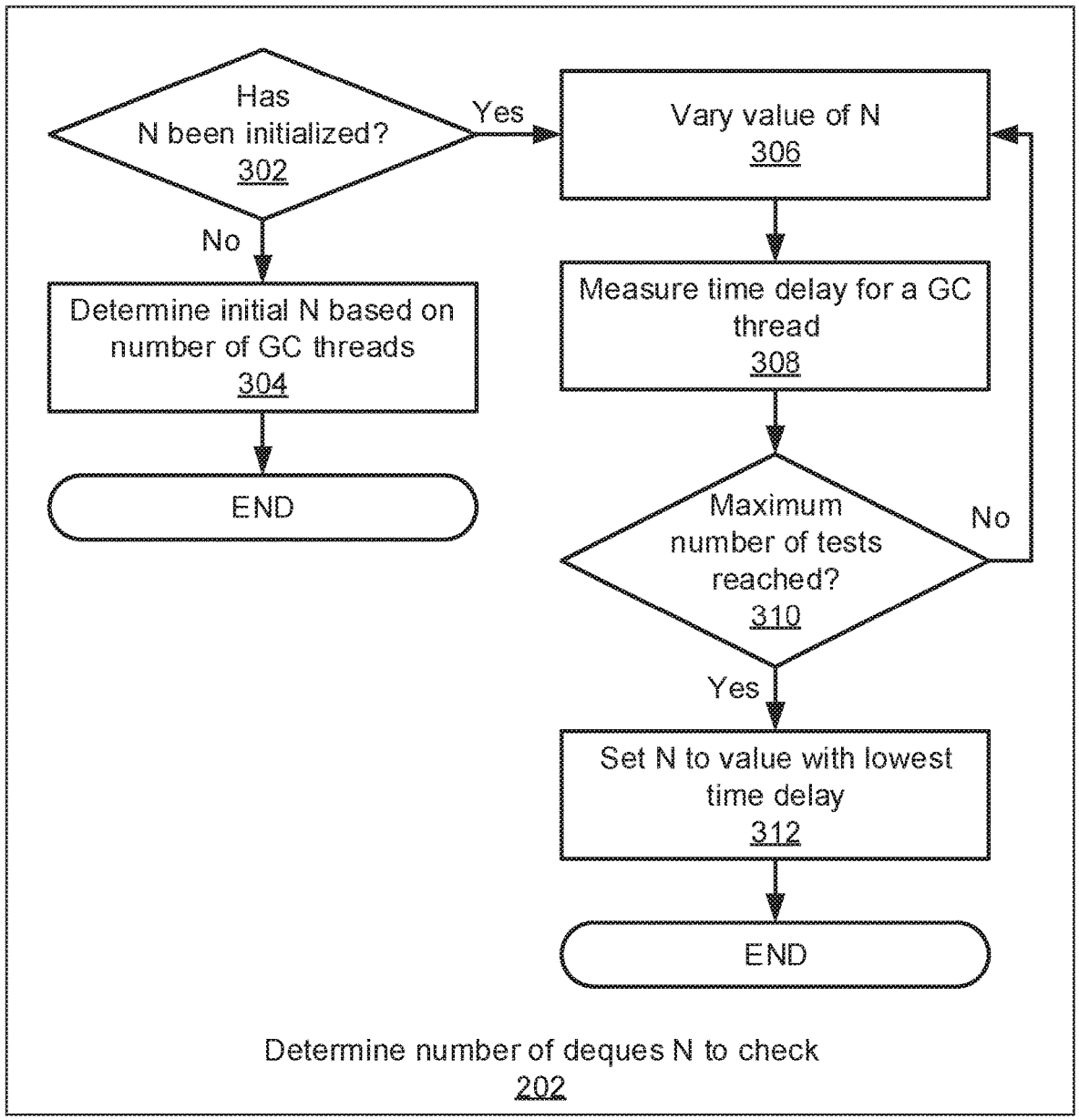
FIG. 3 is a block/flow diagram of a method for determining a number of garbage collection threads to compare before selecting one to take work from in a system that has many garbage collection threads in accordance with an embodiment of the present invention.

Referring now to FIG. 3, a method for determining the number of deques to evaluate before attempting to take work is shown. This figure provides additional detail on block 202 for embodiments where a garbage collection log is generated and includes information regarding pause times for garbage collection threads (e.g., the amount of time between when the garbage collection thread starts looking for work to take and when the garbage collection thread actually performs a garbage collection task).

Block 302 determines whether the number of deques to select, N, has been initialized with some value. If not (i.e., for the first time the garbage collection thread attempts to take work from another deque), block 304 determines an initial value for N based on the number of garbage collection threads. In some embodiments, block 304 determines a value that is proportional to the number of garbage collection threads, with a proportionality constant that is calculated by a ratio of the computational overhead needed to estimate a queue size and the computational overhead needed to attempt to take work from a queue. The value can thus be calculated as:

$$N = N_{GC} \cdot \frac{t_{estim}}{t_{take}} \cdot C$$

where $N_{GC}$ is the number of garbage collection threads, $t_{estim}$ is the time delay incurred by estimating the size of a deque, $t_{take}$ is the time delay incurred by attempting to take work from a deque, and C is a constant value that is determined by the computational environment.

If N has previously been initialized, then the number can be dynamically tuned to reflect up-to-date information regarding the performance. Block 306 varies the value of N, for example increasing or decreasing the value by 1. Block 308 uses the new value to measure the time delay for a particular garbage collection thread. This information can be determined from a garbage collection log. Embodiments where no garbage collection log is available are described below. Block 310 whether a maximum number of different values for N has been tested. For example, the maximum value can be 11, including testing the values N−5, N−4, N−3, N−2, N−1, N, N+1, N+2, N+3, N+4, and N+5. Once the values have been tested, block 312 selects a new value for N that produced the lowest time delay.

Figure 4:
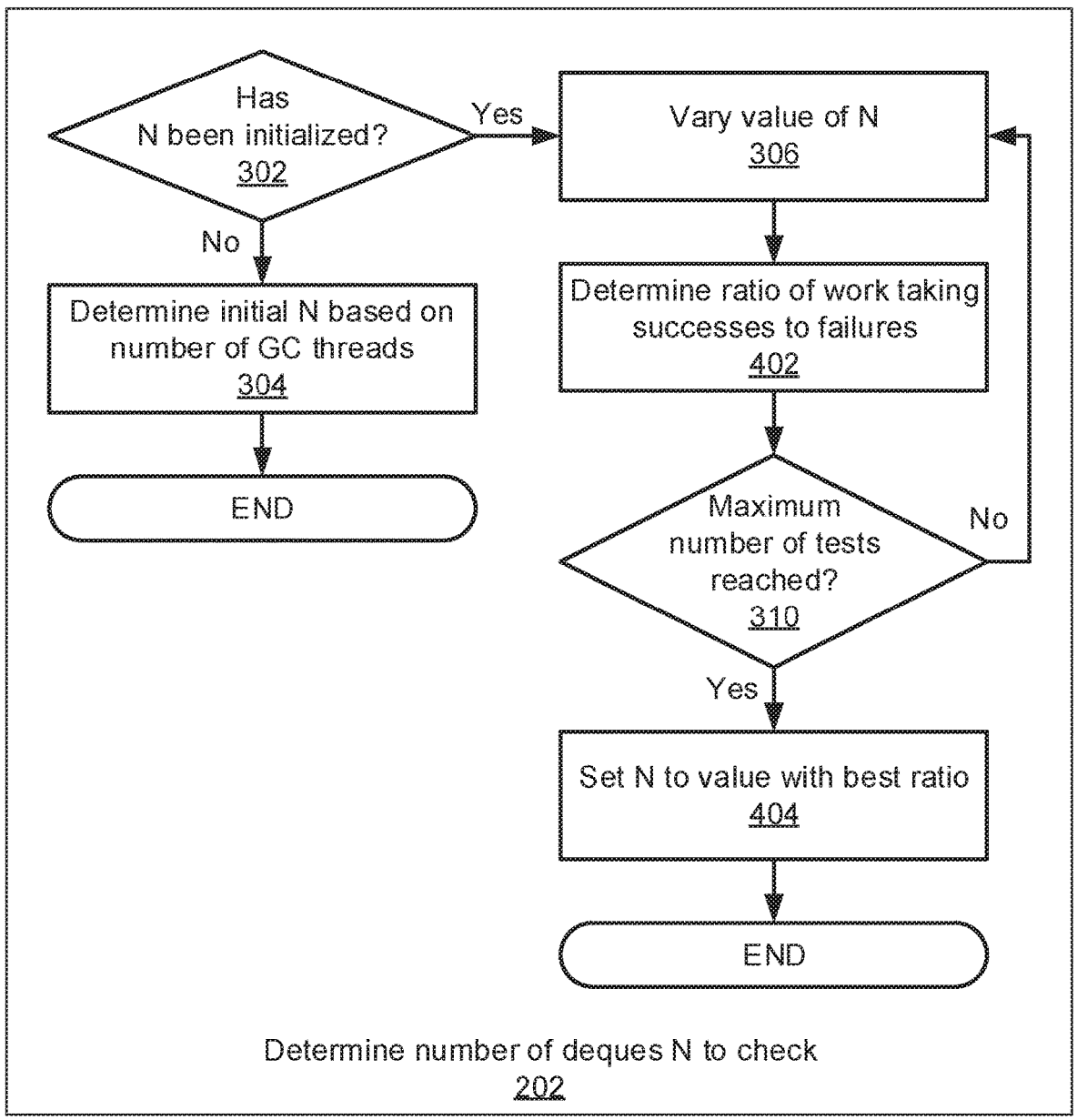
FIG. 4 is a block/flow diagram of a method for determining a number of garbage collection threads to compare before selecting one to take work from in a system that has many garbage collection threads in accordance with an embodiment of the present invention.

Referring now to FIG. 4, a method for determining the number of deques to evaluate before attempting to take work is shown. This figure provides additional detail on block 202 for embodiments where a garbage collection log not available. This embodiment tracks the steps shown in FIG. 2, but instead of determining a time delay for each value of N, block 402 determines a ratio of successes to failures in work-taking trials. Once all of the tests have been performed, block 404 sets the new value of N to correspond to the best ratio of successes to failures.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 5:
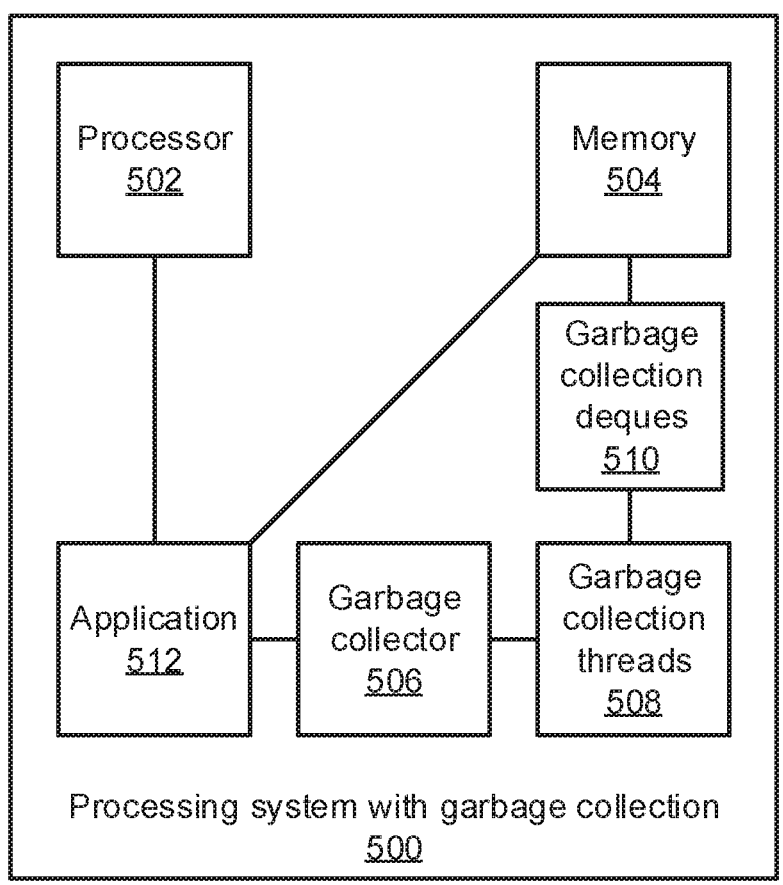
FIG. 5 is a block diagram of a processing system that implements scalable memory garbage collection that includes many garbage collection threads and compares multiple garbage collection threads to one another before selecting one to take work from in accordance with an embodiment of the present invention.

Referring now to FIG. 5, a processing system 500 with efficient garbage collection is shown. The processing system 500 includes a hardware processor 502 and a memory 504. It is specifically contemplated that the hardware processor 502 can implement a multi-threaded processing environment, for example using multiple processor cores or by any other appropriate means.

The processor executes a software application 512 that is stored in memory 504 and that allocates portions of the memory 504 for its operations. When the software application 512 is finished with a particular memory allocation, a garbage collector 506 identifies the obsolete memory and assigns it as a task 110 in a deque 104 of a garbage collection thread 102. The garbage collector 506 manages multiple garbage collection threads 508 in this fashion, distributing the work to the garbage collection deques 510 of respective garbage collection threads 508, with the number of garbage collection threads 508 and deques 510 being determined in any appropriate fashion in view of the hardware being used.

When one of the garbage collection threads 508 exhausts its respective deque 510, it seeks to take work from another deque 510. To accomplish this, the garbage collector 506 selects a set of garbage collection threads and evaluates them to find which of the threads has the most tasks in its deque 510. The garbage collection thread 508 then attempts to take work from the thread having the most tasks in its deque 510. If the garbage collection thread 508 is unsuccessful at taking work, it selects another set of deques for evaluation.

Figure 6:
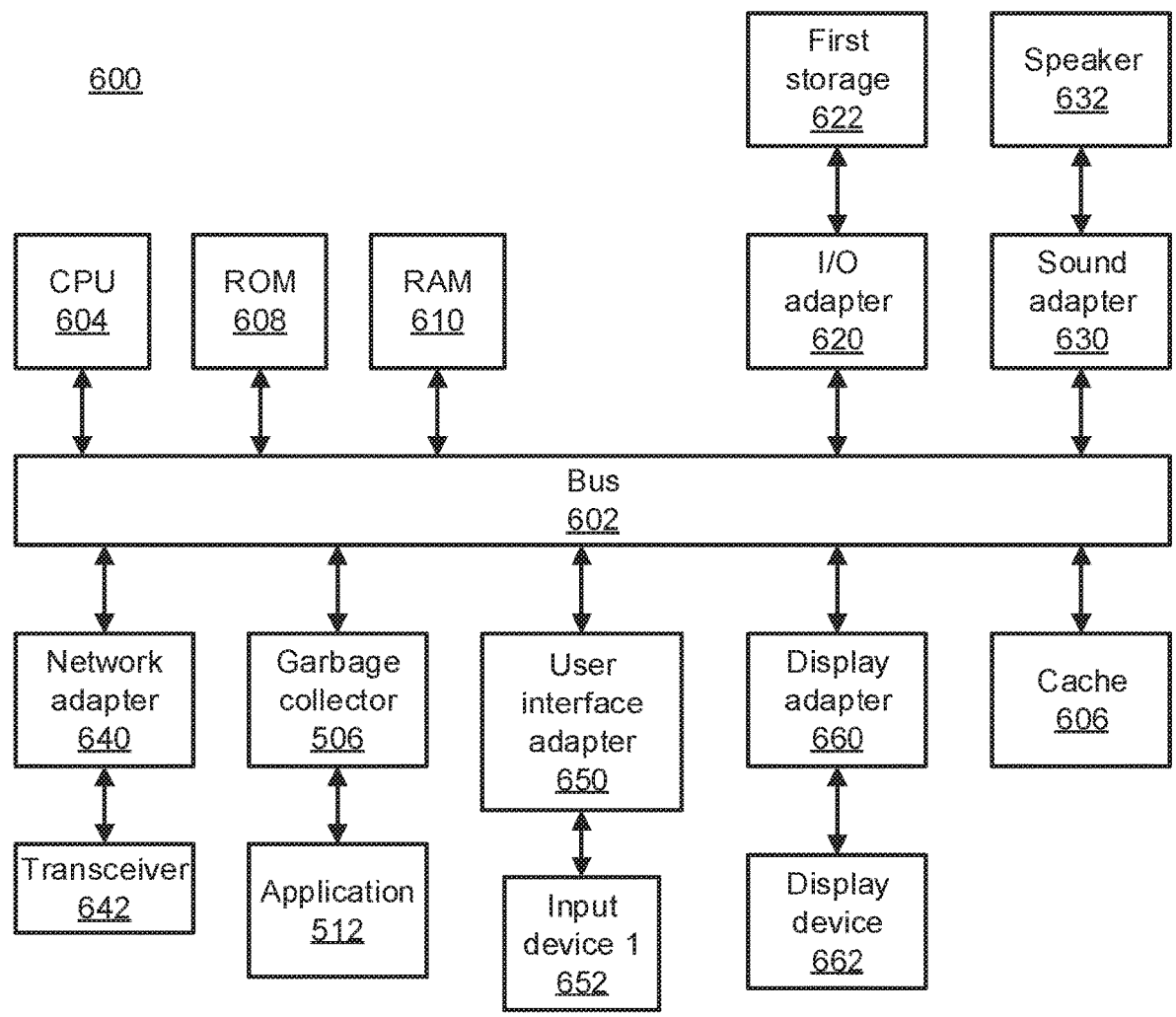
FIG. 6 is a block diagram of a processing system that implements scalable memory garbage collection that includes many garbage collection threads and compares multiple garbage collection threads to one another before selecting one to take work from in accordance with an embodiment of the present invention.

Referring now to FIG. 6, an exemplary processing system 600 is shown which may represent the processing system 500 with garbage collection. The processing system 600 includes at least one processor (CPU) 604 operatively coupled to other components via a system bus 602. A cache 606, a Read Only Memory (ROM) 608, a Random Access Memory (RAM) 610, an input/output (I/O) adapter 620, a sound adapter 630, a network adapter 640, a user interface adapter 650, and a display adapter 660, are operatively coupled to the system bus 602.

A first storage device 622 is operatively coupled to system bus 602 by the I/O adapter 620. The storage device 622 can be any of a disk storage device (e.g., a magnetic or optical disk storage device), a solid state magnetic device, and so forth.

A speaker 632 is operatively coupled to system bus 602 by the sound adapter 630. A transceiver 642 is operatively coupled to system bus 602 by network adapter 640. A display device 662 is operatively coupled to system bus 602 by display adapter 660.

A first user input device 652 is operatively coupled to system bus 602 by user interface adapter 650. The user input device 652 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input device 652 can be the same type of user input device or different types of user input devices. The user input device 652 is used to input and output information to and from system 600.

The processing system 600 further includes a garbage collector 506 that interfaces with one or more applications 512 to manage the deallocation of memory that was allocated by an application 512 and is no longer needed.

Of course, the processing system 600 may also include other elements (not shown), as readily contemplated by one of skill in the art, as well as omit certain elements. For example, various other input devices and/or output devices can be included in processing system 600, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 600 are readily contemplated by one of ordinary skill in the art given the teachings of the present principles provided herein.

Having described preferred embodiments of scalable garbage collection (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for performing memory garbage collection, comprising:
    determining a size of N double-ended queues ("deques") associated with N respective garbage collection threads, where N is three or greater;
    popping a task from a deque out of the N deques having a largest size; and
    performing garbage collection on the popped task.

2. The method of claim 1, wherein popping the task is unsuccessful and a size of N new deques is determined.

3. The method of claim 1, wherein determining the size of the N deques comprises counting a number of tasks in each deque.

4. The method of claim 1, further comprising determining a value N that is proportional to a number of garbage collection threads in a garbage collection system.

5. The method of claim 4, wherein determining the value N comprises calculating a value according to:

$$N = N_{GC} \cdot \frac{t_{estim}}{t_{take}} \cdot C$$

where $N_{GC}$ is the number of garbage collection threads in the garbage collection system, $t_{estim}$ is a time consumed by determining a size of a deque, $t_{take}$ is a time consumed by attempting to take a task from a deque, and C is a constant value determined by a computational environment.

6. The method of claim 4, further comprising determining a new value for N based on garbage collection performance for a plurality of different test values.

7. The method of claim 6, wherein determining the new value for N selects a value for N that results in a lowest garbage collection wait time.

8. The method of claim 6, wherein determining the new value for N selects a value for N that results in a highest ratio of successful attempts to take work to unsuccessful attempts to take work.

9. The method of claim 1, wherein determining the size of a deque has a lower computational burden as compared to popping a task from a deque and wherein popping a task from a deque comprises issuing a memory fence.

10. A non-transitory computer readable storage medium comprising a computer readable program for performing memory garbage collection, wherein the computer readable program when executed on a computer causes the computer to perform the steps of:
    determining a size of N double-ended queues ("deques") associated with N respective garbage collection threads, where N is three or greater;
    popping a task from a deque out of the N deques having a largest size; and
    performing garbage collection on the popped task.

11. A memory garbage collection system, comprising:
    a hardware processor, configured to execute a first garbage collection thread, wherein the first garbage collection thread is configured to determine a size of N double-ended queues ("deques") associated with N respective additional garbage collection threads, where N is three or greater, to pop a task from a deque out of the N deques having a largest size, and to perform garbage collection on the popped task.

12. The system of claim 11, wherein the first garbage collection thread is further configured to determine a size of N new deques if popping the task is unsuccessful.

13. The system of claim 11, wherein the first garbage collection thread is further configured to count a number of tasks in each deque to determine the size of each deque.

14. The system of claim 11, wherein the first garbage collection thread is further configured to determine a value N that is proportional to a number of garbage collection threads in a garbage collection system.

15. The system of claim 14, wherein the first garbage collection thread is further configured to calculate the value N according to:

$$N = N_{GC} \cdot \frac{t_{estim}}{t_{take}} \cdot C$$

where $N_{GC}$ is the number of garbage collection threads in the garbage collection system, $t_{estim}$ is a time consumed by determining a size of a deque, $t_{take}$ is a time consumed by attempting to take a task from a deque, and C is a constant value determined by a computational environment.

16. The system of claim 14, wherein the first garbage collection thread is further configured to determine a new value for N based on garbage collection performance for a plurality of different test values.

17. The system of claim 16, wherein the first garbage collection thread is further configured to select a new value for N that results in a lowest garbage collection wait time.

18. The system of claim 16, wherein the first garbage collection thread is further configured to select a new value for N that results in a highest ratio of successful attempts to take work to unsuccessful attempts to take work.

19. The system of claim 11, wherein determining the size of a deque has a lower computational burden as compared to popping a task from a deque and wherein the first garbage collection queue is further configured to issue a memory fence when popping a task from a deque.

* * * * *